United States Patent [19]

Ishimura

[11] Patent Number: 4,963,910

[45] Date of Patent: Oct. 16, 1990

[54] CAMERA SYSTEM AND INTERMEDIATE ACCESSORY

[75] Inventor: Toshihiko Ishimura, Osaka, Japan

[73] Assignee: Minolta Camera Kabushiki Kaisha, Osaka, Japan

[21] Appl. No.: 475,900

[22] Filed: Feb. 6, 1990

Related U.S. Application Data

[63] Continuation of Ser. No. 291,321, Dec. 28, 1988, abandoned, which is a continuation of Ser. No. 155,504, Feb. 12, 1988, abandoned.

[30] Foreign Application Priority Data

Feb. 16, 1987 [JP] Japan .................................. 62-34739

[51] Int. Cl.$^5$ ............................................ G03B 13/36
[52] U.S. Cl. ................................................. 354/400
[58] Field of Search ........................ 354/400, 402, 286

[56] References Cited

U.S. PATENT DOCUMENTS

| | | | |
|---|---|---|---|
| 4,477,164 | 10/1984 | Nakai et al. | 354/286 |
| 4,509,846 | 4/1985 | Nakai et al. | 354/442 |
| 4,572,638 | 2/1986 | Nakai et al. | 354/286 |
| 4,774,540 | 9/1988 | Taniguchi et al. | 354/402 |

Primary Examiner—W. B. Perkey
Attorney, Agent, or Firm—Burns, Doane, Swecker & Mathis

[57] ABSTRACT

A camera system comprises one or more than two intermediate accessories and the number of the attached intermediate accessories is checked. When the intermediate accessories of more than the permitted number are interposed in the camera system, the automatic focusing operation is prohibited. Therefore, a large driving torque does not occur so as to prevent the bad effect on the camera driving system.

7 Claims, 8 Drawing Sheets

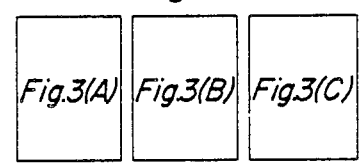
Fig. 3
Fig. 3(A)
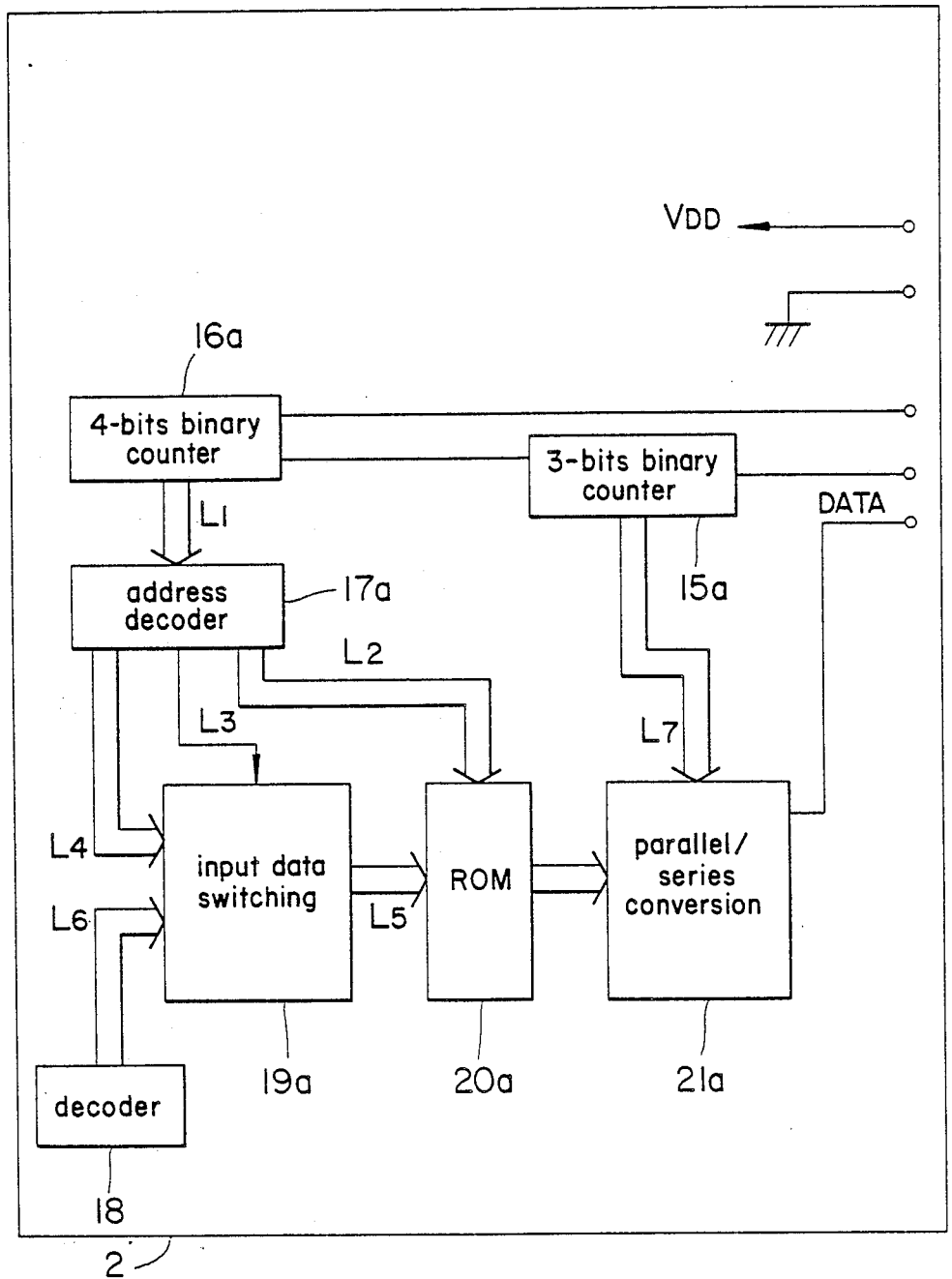

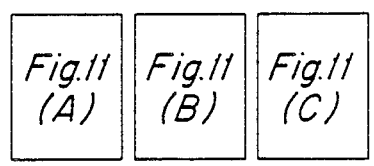
Fig. 11
Fig. 11(A)
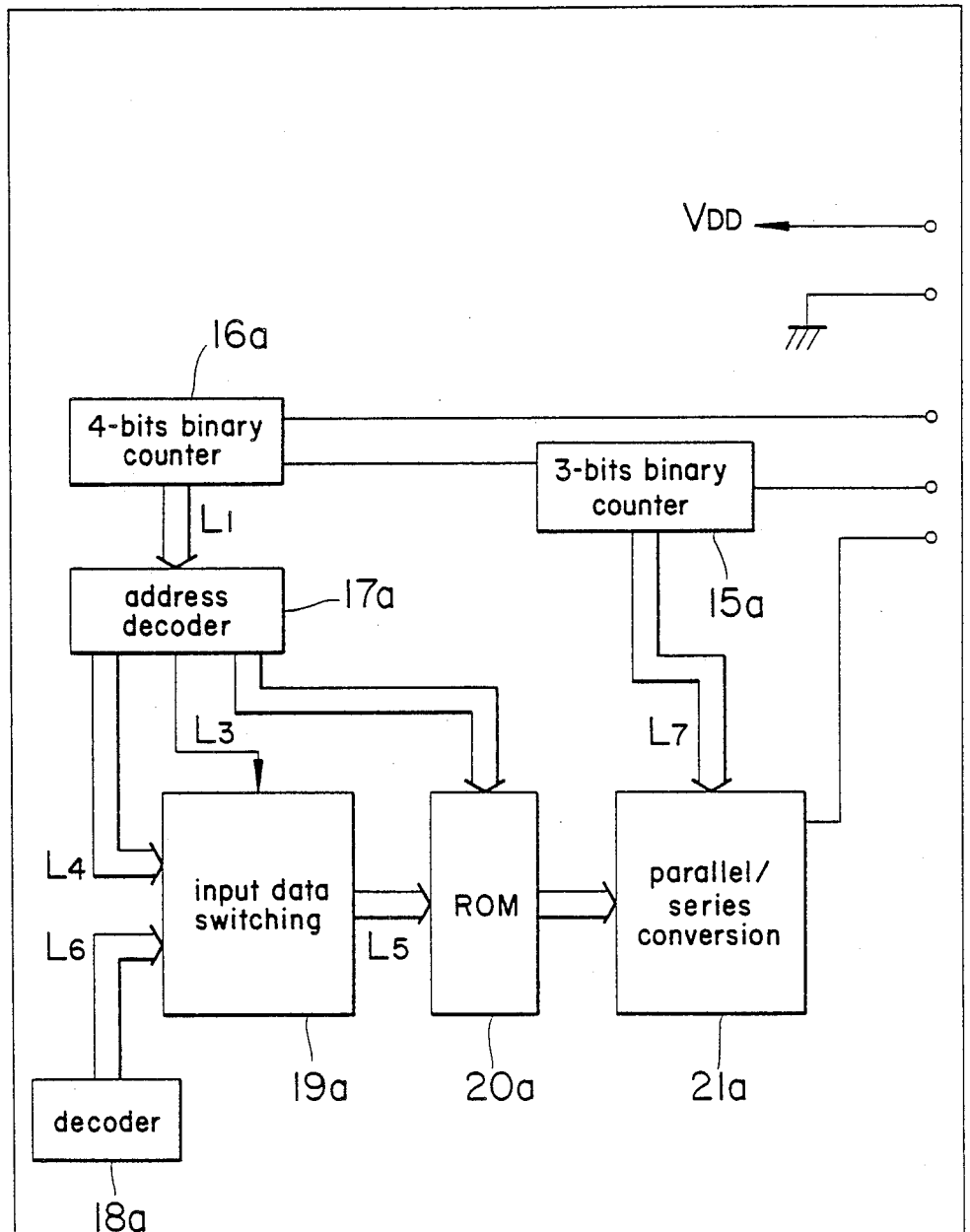

CAMERA SYSTEM AND INTERMEDIATE ACCESSORY

This application is a continuation of application Ser. No. 07/291,321, filed Dec. 28, 1988, which is a continuation application of prior application Ser. No. 155,504 filed on Feb. 12, 1988, now abandoned.

BACKGROUND OF THE INVENTION

1. Field of the Invention

The present invention relates to an intermediate accessory, such as a rear converter, an extension tube and a bellows, which is mounted or interposed between a camera body and an interchangeable lens, and relates to a camera system in which said intermediate accessory is interposed. More particularly, the invention relates to such an accessory for use in a photographic camera system wherein various constant and variable data inherent to the objective lens, such as the maximum and minimum F-numbers, the focal length, data indicative of the relationship between the direction of the rotation of a motor in an automatic focus camera body and the direction of the movement of the lens system, and data indicative of the relationship between the amount of the rotation of said motor and the amount of the shifting of the in-focus position, are transmitted from the interchangeable lens to the camera body, the data are processed and the resultant data are used for automatic exposure control, automatic focus control, and various warnings and indications.

2. Description of the Prior Art

Generally, an intermediate accessory is interposed between the camera body and the interchangeable lens, thereby enabling a close photograph or extending the focal length of the photographic optical system. Moreover, with the progress of camera technology in recent years, the converter is provided so as to operate the automatic exposure control device and automatic focusing device. However, when more than one converter is interposed between the camera body and the interchangeable lens opposition to the maker's design, there occurs a lowering of the performance of the automatic exposure control device, a lowering of the precision of the automatic focusing device, furthermore a problem of the strength of the driving speed reduction system in the automatic focusing device.

To describe in detail, in FIGS. 1 and 2, a rear converter lens 3 comprises a rear converter lens system $L_C$. Bayonet mounting member 31 in the rear side (in the right side in FIGS. 1 and 2) and bayonet mounting plate 32 in the front side (in the left side in FIGS. 1 and 2) form interconnecting means for interconnecting the rear converter lens 3 respectively to the camera body 1 and to the interchangeable lens 2. Reference numerals 33 and 34 respectively denote a mediating submission shaft and a mediating driving output shaft, which are disposed coaxially with each other a connection concave portion 33a is formed on the rear end portion of the mediating submission shaft 33, to be engaged with a driving output shaft 30 of the camera body 1 a connection convex portion 34a is formed on the front end portion of the mediating driving output shaft 34, to be engaged with a submission shaft 50 of the interchangeable lens 2. The mediating submission shaft 33 is supported between the bayonet mounting member 31 and a shaft supporting plate 35. On the front end portion of the mediating submission shaft 33 passing through the shaft supporting plate 35, there is fixedly provided a gear 39 to be engaged with a gear 38 which is fixedly provided around the one side portion of a relay shaft 37 which is supported between the shaft supporting plates 35 and 36. The mediating driving output shaft 34 is supported between the bayonet mounting plate 32 and the shaft supporting plate 36. On the rear end portion of the mediating driving output shaft 34 there is fixedly provided a gear 41 engaging with another gear 40 fixed to the relay shaft 37. The mediating driving output shaft 34 comprises a flange portion 34b, and a spring member 42 is interposed between the flange portion 34b and the shaft supporting plate 36, so that the convex portion 34a is forced to be projected from the bayonet mounting plate 32 by the spring member 42. However, when a connection release button 43 is depressed, a connection plate 44 connected to the connection release button 43 through a mechanism (not shown) pushes the flange portion 34b backward, so that the mediating driving output shaft 34 is moved to the position against the spring 42 so as to sink the convex portion 34a into the bayonet mounting plate 32. The gears 38, 39, 40 and 41 together with the relay shaft 37 compose a drive transmission system transmitting the rotation of the mediating submission shaft 33 to the mediating driving output shaft 34, which is designed as a speed reduction system when the rear converter lens system $L_C$ works as a tele-converter.

In FIG. 2 showing a condition that the rear converter lens 3 is mounted between the camera body 1 and the interchangeable lens 2, the driving output shaft 30 is projected from the mounting plate 30a in the camera body 1. Reference numeral 45 denotes a movable main mirror in a single lens reflex camera, and a light passing through a transparent portion formed in the center portion of the movable main mirror 45 is reflected by a subsidiary mirror 46 so as to be applied to a focus detecting element 47. Herein, the light receiving surface of the focus detecting element 47 is disposed on the position optically equivalent to the film surface, i.e., the predetermined focal plane in the camera body 1. Reference numeral 48 denotes a control circuit generating a signal representing the defocus direction and a signal representing the defocus amount on the basis of the output of the focus detecting element 47, thereby controlling the driving direction and the driving amount of a driving motor M in the camera body 1. The motor M drives a gear 30b fixed to the driving output shaft 30 through a suitable gears line composing a driving transmission system.

On the other hand, the interchangeable lens 2 comprises bayonet mounting member 52 in the rear end portion thereof and comprises an optical system $L_E$ working as a focusing optical system inside thereof. Although the interchangeable lens 2 shown in FIG. 2 is a type of moving the entire part of the optical system $L_E$ and the entire optical system forms a focusing optical system, a part of the optical system may be used as a focusing optical system. The rotation of the submission shaft 50 is transmitted through a gears line composing a drive transmitting system to a helicoid screw member 54 which is a focusing optical system moving mechanism so as to rotate the helicoid screw member 54, whereby helicoid screws 56 and 59 are operated so as to move the focusing optical system $L_E$ in the direction of the optical axis thereof.

By the way, if the interchangeable lens 2 is directly mounted on the camera body 1 without interposing the rear converter lens 3, the data signals inherent to the interchangeable lens 2 are applied to the control circuit 48 in the camera body 1. That is, in the interchangeable lens 2 there is provided ROM (read only memory) 58 storing a value $K_M$ inherent to the interchangeable lens 2, wherein the value $K_M$ represents the ratio of the rotation of the submission shaft 50 to the defocus amount thereby as follows.

$$K_M = k_M / l_M \cdot \mu_M \quad (1)$$

Herein, $k_M$: the ratio ($=\Delta d / \Delta L$) of the amount $\Delta L$ of moving the focusing optical system $L_E$ to the defocus amount $\Delta d$ $\mu_M$ the gear ratio of the drive transmitting system ($\mu_M < 1$ at the time of speed reduction system)

$l_M$: the lead of the helicoid screw 56

On the contrary, as shown in FIG. 2, if that the rear converter lens 3 is interposed between the interchangeable lens 2 of a type of moving the entire optical system for focusing operation and the camera body 1, the ratio $K_M$ of the amount of moving the focusing optical system $L_E$ to the defocus amount is changed due to the conjunction of the focusing optical system $L_E$ and the rear converter lens system $L_C$. Assuming that the ratio of the amount of moving the focusing optical system $L_E$ to the defocus amount when the rear converter lens 3 is interposed, which is inherent to the conjunct entire optical system, is $K_{MC}$, the ratio $K_{MC}$ is shown as follows, $$K_{MC} = (f_M / f_{MC})^2 \quad (2)$$

wherein $f_M$: the focal length of the focusing optical system $L_E$ only of the interchangeable lens, $f_{MC}$: the compound focal length of the conjunction system of the focusing optical system $L_E$ and the rear converter lens system $L_C$. Herein, assuming that the magnification (referred to as MAGNIFICATION hereinafter) of the rear converter lens system $L_C$ is M, since $f_{MC} = M \cdot f_M$, results in $K_{MC} = M^{-2}$.

Accordingly, in this case the ratio $K_{MC}$ of the rotational frequency of the submission shaft to the defocus amount in the conjunction optical system is represented as follows, $$K_{MC} = \frac{M^{-2}}{l_M \cdot \mu_M \cdot \mu_c \cdot \eta_c} \quad (3)$$

wherein $\mu_C$: the gear ratio of the drive transmitting system provided in the rear converter lens 3, $\eta_C$: the transmission coefficient of the signal transmitting system.

In other words, the product of the multiplication of the transmission coefficient $\mu_C$ of the drive transmitting system in the rear converter lens 3 and the transmission coefficient $\eta_C$ of the signal transmitting system is determined by the MAGNIFICATION of the rear converter lens 3. For example, in case of the tele-converter lens of which the MAGNIFICATION rate is two, the production value $\eta_C \cdot \mu_C$ should be ¼, therefore, the values $\eta_C$ and $\mu_C$ are set as follows, for example, $\eta_C = \frac{1}{2}, \mu_C = \frac{1}{2}$ or $\eta_C = \frac{3}{4}, \mu_C = \frac{1}{3}$.

Herein, in the case of the tele-converter in which the focal length of the conjunct optical system is longer than that of only the interchangeable lens, since the ratio of the moving amount of the focusing optical system to the defocus amount becomes small from the expression (2), the minimum amount of the displacement of the image plane becomes large and the speed of the movement of the focusing optical system to the in-focus condition becomes large so that the focusing optical system does not stop in the in-focus condition so as to exceed the in-focus position, which results in the deterioration of the precision of the focusing optical system. Therefore, upon setting the gear ratio $\mu_C$ of the drive transmitting system to the speed reduction system, the driving speed of the drive transmitting system is reduced so as to raise the focusing precision of the focusing optical system. However, the driving torque becomes large and the load applied to the stopper located at the infinity focusing position of the focusing optical system and at the closest focusing position thereof becomes large. Furthermore if two or more converter lenses are interposed by mistake between the interchangeable lens 2 and the camera body 1, further larger load is applied to the stoppers by the speed reduction driving system of the interchangeable lens 2 and the converter lenses, thereby causing possible damage to the stoppers.

In order to solve the inconveniences mentioned above, there may be considered a mechanism in which two or more converter lenses can not be interposed because of the mechanical interference of the mounting portion, but in this case there is a defect that the mounting portion becomes complicated. Though the transmission of data signals through a single converter lens has been disclosed in U.S. Pat. No. 4,572,638, is not disclosed that data signals transmitted through a plurality of converter lens interposed in the camera system are used to inhibit a camera operation.

SUMMARY OF THE INVENTION

An object of the present invention is to provide a camera system electrically transmitting a plurality of data of the interchangeable lens to the camera body, wherein the operation of the automatic focusing device or the exposure operation is interrupted by the process of the signals in the intermediate accessory in response to the data signals sent from the interchangeable lens when two or more accessories are interposed between the interchangeable lens and the camera body.

According to the present invention, to attain the object mentioned above, in the camera system capable of interposing the intermediate accessory between the camera body and the interchangeable lens, the intermediate accessory comprises data memory means for storing the data inherent to the intermediate accessory, data adding means for adding the data representing said intermediate accessory to the data inherent to the interchangeable lens sent from the interchangeable lens through the interchangeable lens mounted on the front portion of said intermediate accessory or the other intermediate accessory and, data sending means for sending the data added by the data adding means to the camera body.

On the other hand, the camera body according to the present invention comprises discriminating means for discriminating whether or not the data sent from said interchangeable lens or intermediate accessory represents a predetermined value, and interrupting means for interrupting the automatic focus control of the camera or the exposure operation thereof when it is discriminated that the data transmitted by said discriminating means does not represent the predetermined value.

Moreover, the intermediate accessory according to the present invention is used in a camera system in which the automatic focus control of the camera or the exposure operation thereof is interrupted when it is discriminated by the discriminating means whether or not the data signal sent from the interchangeable lens or the intermediate accessory represents the predetermined value and when it is discriminated that the data signal does not represent the predetermined value, wherein said intermediate accessory comprises; data memory means for storing the data inherent to the intermediate accessory, data adding means for adding the data representing said intermediate accessory to the data inherent to the interchangeable lens sent from the interchangeable lens through the interchangeable lens mounted on the front portion of said intermediate accessory or the other intermediate accessory, and data transmitting means for transmitting the data added by the data adding means to the camera body.

According to the camera system of the present invention, the intermediate accessory adds the data representing said intermediate accessory to the data inherent to the interchangeable lens sent from the interchangeable lens mounted on the front portion of the intermediate accessory through the interchangeable lens or the other intermediate accessory so as to transmit this data to the camera body. On the other hand, in the camera body, if the data sent from said interchangeable lens or the intermediate accessory does not represent the predetermined value, it is judged that the intermediate accessories of more than the predetermined number are mounted, so that the automatic focus control of the camera is interrupted.

Moreover, referring to the intermediate accessory of the camera system according to the present invention, since the data representing said intermediate accessory is added to the data inherent to the interchangeable lens mounted on the front portion of the intermediate accessory sent from the interchangeable lens through the interchangeable lens or the other intermediate accessory so as to be transmitted to the camera body, the number of said intermediate accessories mounted in the camera system can be detected by the transmitted data in the camera body, whereby the automatic focus control, for example, can be interrupted.

BRIEF DESCRIPTION OF THE DRAWINGS

FIG. 5 is a block diagram showing an example of the arithmetic circuit in FIG. 4, FIG. 6 shows an example of the adding circuit of the embodiment in FIG. 5, FIG. 7 shows a time chart showing the operation timing of the circuit in FIG. 6, FIG. 8 shows an example of the substitution circuit in FIG. 5, FIGS. 9 and 10 are the block diagrams of the left bit shift circuit in FIG. 5, FIG. 12 is flow chart related to the operations performed by the camera system in FIG. 11.

DETAILED DESCRIPTION OF THE PREFERRED EMBODIMENT

Figure 1:
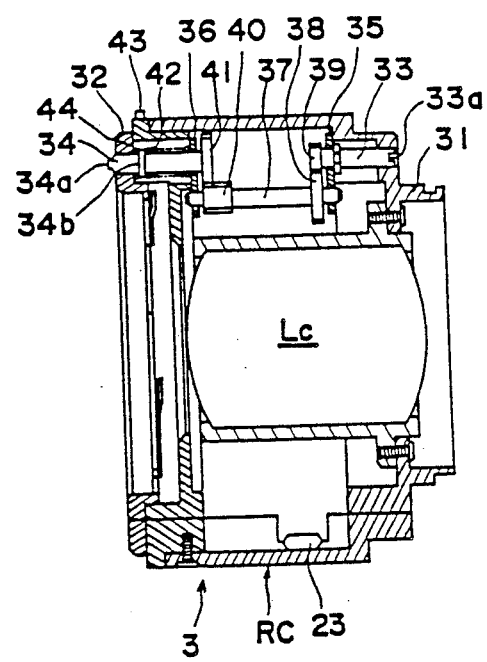
FIG. 1 is a sectional view of a converter lens.

Before the explanation of the construction and operation of the embodiment of the invention, an explanation will first be made about the data to be transmitted from an interchangeable lens to the camera body and an arithmetic operation performed in a rear converter as an intermediate accessory.

The interchangeable lens of the embodiment outputs a total of nine kinds of data such as imperfect coupling checking code data, minimum F-number data, a maximum F-number data, data discriminating the existence of the converters, release time lag data, full aperture light blockage data, data of the rotational direction of an automatic focusing motor (hereinafter called AF motor), adjusting amount conversion coefficient data for automatic focusing, and focal length data.

The imperfect coupling checking code data signal indicates whether or not an interchangeable lens is correctly mounted on the camera body, and the signal is output depending on the status of a switch that is activated when the lens is correctly mounted. The camera reads out the signal first and determines that the objective lens of the camera is correctly mounted, for example, when "10101010" is read out, and thereafter performs exposure control operation based on the data from the objective lens. When data signals other than "10101010" are read out to indicate an imperfect or unmatched coupling, which means that the camera body is coupled with an interchangeable lens nondedicated to the relevant system, the camera performs an exposure control operation that is not based on the data from the objective lens. When a converter lens is interposed between an interchangeable lens and the camera body, the converter receiving the imperfect coupling checking code signal will transmit the signal to the camera body after performing an adding operation of +0 (adding 0) on the signal. In other words, the data from the interchangeable lens is transmitted to the camera body without being processed or modified. It should be noted that whenever an imperfect or unmatched coupling occurs either between the interchangeable lens and the converter or between the converter and the camera body, data signals other than "10101010" indicating the imperfect or unmatched connection will be transmitted to the camera body.

The data of minimum F-number and the maximum F-number are stored in the ROM of the interchangeable lens in the form corresponding to the Av (Av=$\log_2 F^2$) of the minimum F-number (F value when the diaphragm is fully opened) and of the maximum F-number (F value when the diaphragm is stopped down to the minimum size) of the interchangeable lens based on the apex system. The Av value may be changed by ratio of ⅛ Ev. For example, when the minimum F-number is F:1.68 of which Av is 1+(4/8), data value of "00001100" is stored. In the case when the maximum F-number is F:32 of which Av is 10+(0/8), data value of "01010000" is stored. When a converter lens is mounted on the interchangeable lens, their compound F-number will be nF, which means the F value multiplied by n (n is the magnification of the converter), namely, $\log_2 n^2$ of the magnification n is added to the Av value. For example, when a converter lens has a magnification of two, two should be added to the Av values of the minimum and maximum F-numbers. Accordingly, "00010000" will be added to the digital data sent from the interchangeable lens, and then the combined data are sent to the camera body.

The data discriminating the existence of the converters is a data for discriminating how many converter lenses are interposed between the camera body and the interchangeable lens.

There is stored a data "00000000" in the ROM of the interchangeable lens, and a data "00000001" in the ROM of the converter lens. When the converter lens is mounted on the interchangeable lens, the data "00000000" sent from the interchangeable lens to the converter lens is added to the data value "00000001", so that the combined data value "00000001" is sent to the camera body. When the data discriminating the existence of the converters received by the camera body is "00000000" or "00000001", it is judged in the camera body that no converter lens or one converter lens is interposed between the interchangeable lens and the camera body, so that the normal release operation and the automatic focus control are executed.

On the other hand, when two converter lenses, for example, are interposed between the camera body and the interchangeable lens, the data "00000001" calculated by a first converter lens close to the interchangeable lens is send to a second converter lens close to the camera body, furthermore, in the second converter lens the adding operation is performed ("00000001" + "00000001" = "00000010"), so that the combined data valve "00000010" is sent to the camera body.

Since the data received by the camera body is neither "00000000" nor "00000001", only the automatic focus control is prohibited, for example, and the shutter release operation is only performed. Otherwise, both the automatic focus control and the shutter release operation are prohibited, whereby a blurred photograph operation due to the lowering of the automatic focusing ability or a trouble of the driving speed reduction system in the automatic focus control device can be prevented.

The full aperture light blockage data is data to prevent the occurrence of an erroneous control and display when a tele-converter is mounted on an interchangeable lens with a small minimum F-number (for example, F:1.2 and F:1.4) and the light beam passing through the lens and the tele-converter is partially blocked in the range from F:1.7 to full aperture. Assuming that a tele-converter having a magnification power of two partially blocks the light beam passing through the interchangeable lens at the aperture of F:1.7 to the full aperture, an Av value corresponding to $F1.7 \times 2 = F3.4$ will be stored in the ROM of the tele-converter. Also, data corresponding to the Av value equal to that of the minimum F-number is stored in the area where the full aperture light blockage data of the interchangeable lens is to be stored. The data that has been sent from the interchangeable lens to the converter lens (in the above discussed case, the data indicating an aperture value of F:3.4) is received in the converter lens and is substituted by the data stored in the ROM of the converter lens, and then it is sent to the camera body. In the camera body, the dimensions of the two values, i.e., the minimum F-number data value and the full aperture light blockage data, are compared, and if the latter is determined to be greater than the former, the camera body performs a normal exposure calculation, control and display using the minimum F-number data. When the minimum F-number is found to be smaller than the full aperture light blockage data value, the camera body takes in a diaphragm value corresponding to the full aperture light blockage data value as the minimum F-number and then performs subsequent exposure calculation and control.

The release time lag data shows the maximum stopping down time for each interchangeable lens and is equivalent to a period required for stopping the diaphragm from the full aperture to the minimum aperture or the sum of this period and a period required for the diaphragm to be stabilized after its stoppage. The data is stored in terms of millisecond units in the ROM of the interchangeable lens. For example, the maximum stopping down time of 30 milliseconds is expressed as "00011110" while 50 milliseconds as "00110010". When a rear converter is mounted on the interchangeable lens, there is a possibility that the dynamic characteristics of the diaphragm stopping down may deteriorate with resultant prolonged stopping down time. To overcome this problem, data corresponding to a value obtained by adding data corresponding to 20 milliseconds, for example, to the data fed from the interchangeable lens is supplied to the camera body. Namely, the converter adds "00010100" to the data transmitted from the interchangeable lens and sends the resultant data to the camera body.

The AF motor rotational direction data indicates whether the rotation of the AF motor (a motor provided in the camera body for focus adjustment) in the normal direction causes the focusing lens group of the interchangeable lens driven in the direction to be focused on nearer or longer distance. In other words, in the case of an overall lens system driven type lens, the data will indicate whether the AF motor rotation in the normal direction will shift the lens system forward or rearward. For example, when the rotation of the AF motor in the normal direction causes the interchangeable lens to move forward, the data "00000001" is stored in the ROM of the interchangeable lens, while to move rearward, the data "00000000" is stored in the ROM of the interchangeable lens. If the motor rotating direction is unchanged even when the rear converter is mounted on the objective lens, a data value "00000000" will be added to the data fed from the interchangeable lens. If the motor rotating direction is inverted by the converter, for example, the interchangeable lens, which is shifted forward by the rotation of the AF motor in the normal direction, is shifted rearward by the same motor rotation when a certain converter is mounted, a data value "00000001" is added to the data fed from the interchangeable lens. The camera body determines the direction of the rotation of the AF motor depending on whether the lowest-ranking bit (LSB) of the received data is "0" or "1".

The lens adjusting amount conversion coefficient data is used in the conversion of a defocus amount $\Delta L$ to an amount of AF motor driving in the case that defocus amount $\Delta L$ and the defocus direction are detected and the focusing of the objective lens is adjusted with the AF motor being driven by an amount corresponding to the detected defocus amount and in the direction depending on the detected defocus direction. The defocus amount $\Delta L$ here means the amount of displacement of an image plane from a predetermined focal plane.

The defocus direction indicates whether the image is formed before or after the predetermined focal plane, in other words, whether the objective lens is in a front-focus or rear-focus condition. Namely, the lens shifting amount conversion coefficient has a value proportional to $\Delta L/Dd$, which is a ratio of the defocus amount $\Delta L$ to the amount $\Delta d$ of the shifting of the lens. In the actual control of the lens, the coefficient data is determined by the ratio between the amount of defocus with respect to the image plane and the pulse coefficient which represents the number of pulses corresponding to the amount of the movement of the lens-driving mechanism by the AF motor and which indicates the amount of shifting the lens for a given amount of rotation of the AF motor in the camera body. The unit of the coefficient is pulse/$\mu$m :

Now, given a focal length $f$ of the overall optical system and focal length $f_1$ of the optical system for focusing, it is generally known that $\Delta d$ is proportional to $(f_1/f)^2 \times \Delta L$.

If the lens shifting amount coefficient is calculated in accordance with the formula $\Delta d = (f_1/f)^2 \times \Delta L$ and the absolute value of the calculated value is stored in the ROM of the interchangeable lens, the lens shifting amount conversion coefficient will be $\frac{1}{2}$ and $\frac{1}{4}$ times if a converter lens having magnification power of $\times 1.4$ or $\times 2$ is attached to the lens, with the focal length $f$ of the overall optical system becoming 1.4 times or 2 times respectively. Accordingly, the binary-coded data of the lens shifting amount conversion coefficient fed from the interchangeable lens is sent to the camera body after an arithmetic operation shifting by 1 bit or 2 bits to the left is given to the data in the converter. Also, the lens shifting amount conversion coefficient is expressed by an exponent with a base of 2 calculated by the formula $\Delta d = (f_1/f)^2 \times \Delta L$, and is expressed as a binary number of a total of 8 bits consisting of 4 bits for significant figures and 4 bits for exponent, as shown in Table 1 below.

TABLE 1

| $k_3$ | $k_2$ | $k_1$ | $k_0$ | $l_3$ | $l_2$ | $l_1$ | $l_0$ |
|---|---|---|---|---|---|---|---|
| Significant Figures | | | | Exponent Portion | | | |

From this table and the formula below $$\left[\sum_{n=1}^{3} k_n \cdot 2^n\right] \times 2\left[\sum_{n=0}^{3} l_n \cdot 2^n\right]$$

it can be derived that when a rear converter having a magnifying power of $\times 1.4$ or $\times 2$ is attached to the interchangeable lens, the AF lens shifting amount conversion coefficient will be $\frac{1}{2}$ times and $\frac{1}{4}$ times respectively. Thus the coefficient for the compound optical system can be obtained by subtracting 1 or 2 from the exponent portion. Namely, the data fed from the interchangeable lens will be sent to the camera body after "00001111" or "00001110" is added thereto in the converter.

Finally, the data of the focal length $f$ is used for setting a critical value for the warning of blurred occurring shutter speed or for the determination of a diaphragm value for flash photography. In the case of an interchangeable lens with a fixed focal length, the data F1 is expressed in terms of a binary-coded expression of logarithmically compressed value in accordance with an equation of $$F1 = \log_2(f/6.25)^8$$

and is stored in the ROM of the interchangeable lens. For example, in case of an interchangeable lens having $f = 50$ mm, 100 mm or 200 mm, the focal length data F1 can be expressed as F1 = 24 = "00011000", F1 = 32 = "00100000" and F1 = 40 = "00111000" respectively. Namely, when the focal length is doubled, the focal length data F1 will increase by 8. When a rear converter with magnifying power of $\times 1.4$ or $\times 2$ is attached to the interchangeable lens, a data obtained by adding "00000100" or "00001000" to the data fed from the interchangeable lens may be transmitted to the camera body.

Also, if the case a zoom converter with a magnifying power varying from $\times 1.4$ to $\times 2$ is attached to the interchangeable lens, one of the values between "00000100" and "00001000" may be added to the data fed from the interchangeable lens in accordance with the zooming of the zoom converter, and then the resultant value of the addition will be sent to the camera body.

As described above, correct data of the composite optical system can be transmitted to the camera body with the appropriate value depending on the characteristics of the rear converter attached to the interchangeable lens being added to or substituted by the data fed from the interchangeable lens or with the fed data being shifted by an appropriate number depending on the characteristics.

Figure 3B:
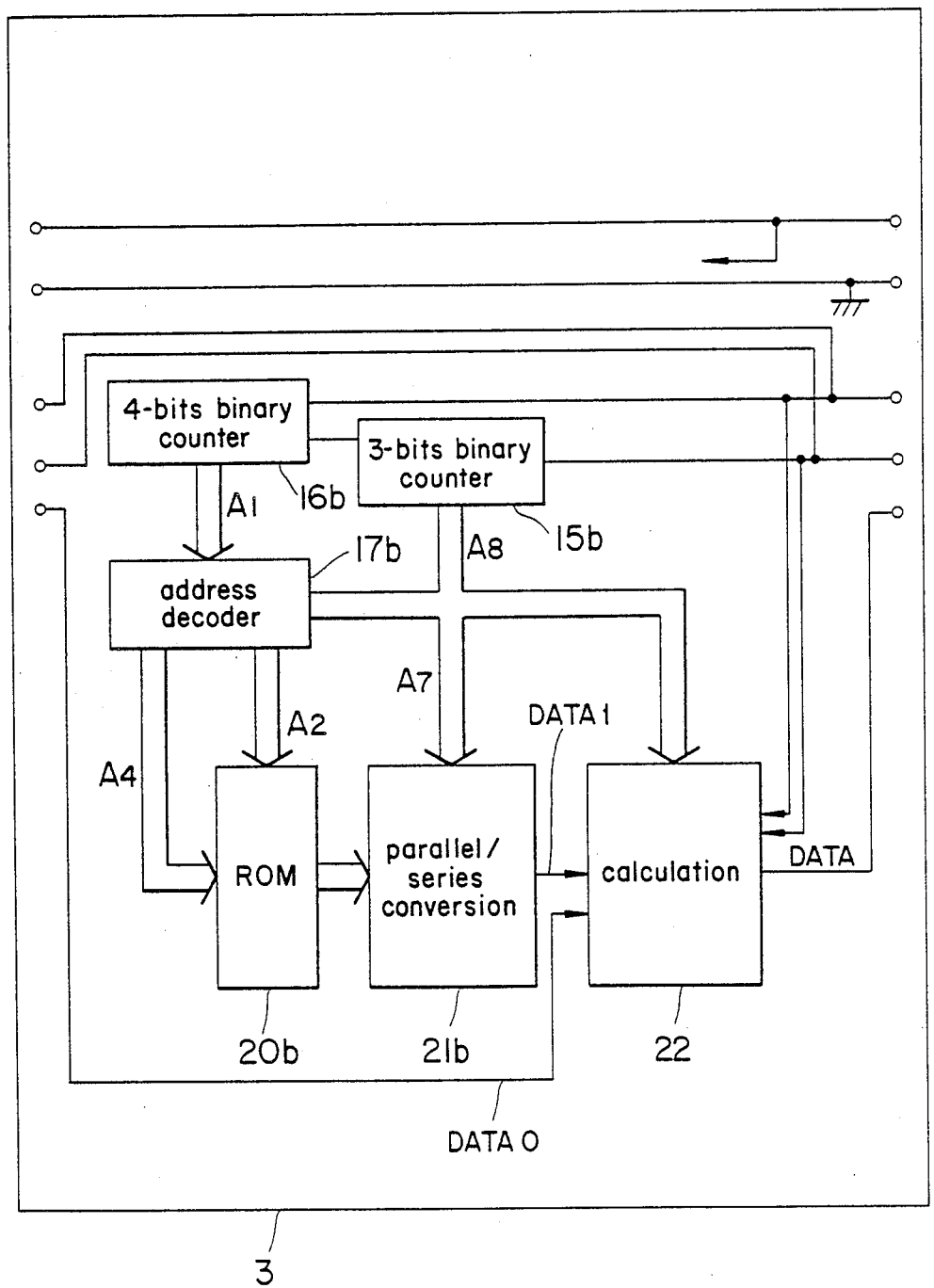
FIG. 3 shows the relationship of block diagrams 3(A), 3(B) and 3(C) showing an intermediate accessory and its related section according to an embodiment of the present invention.
Figure 3C:
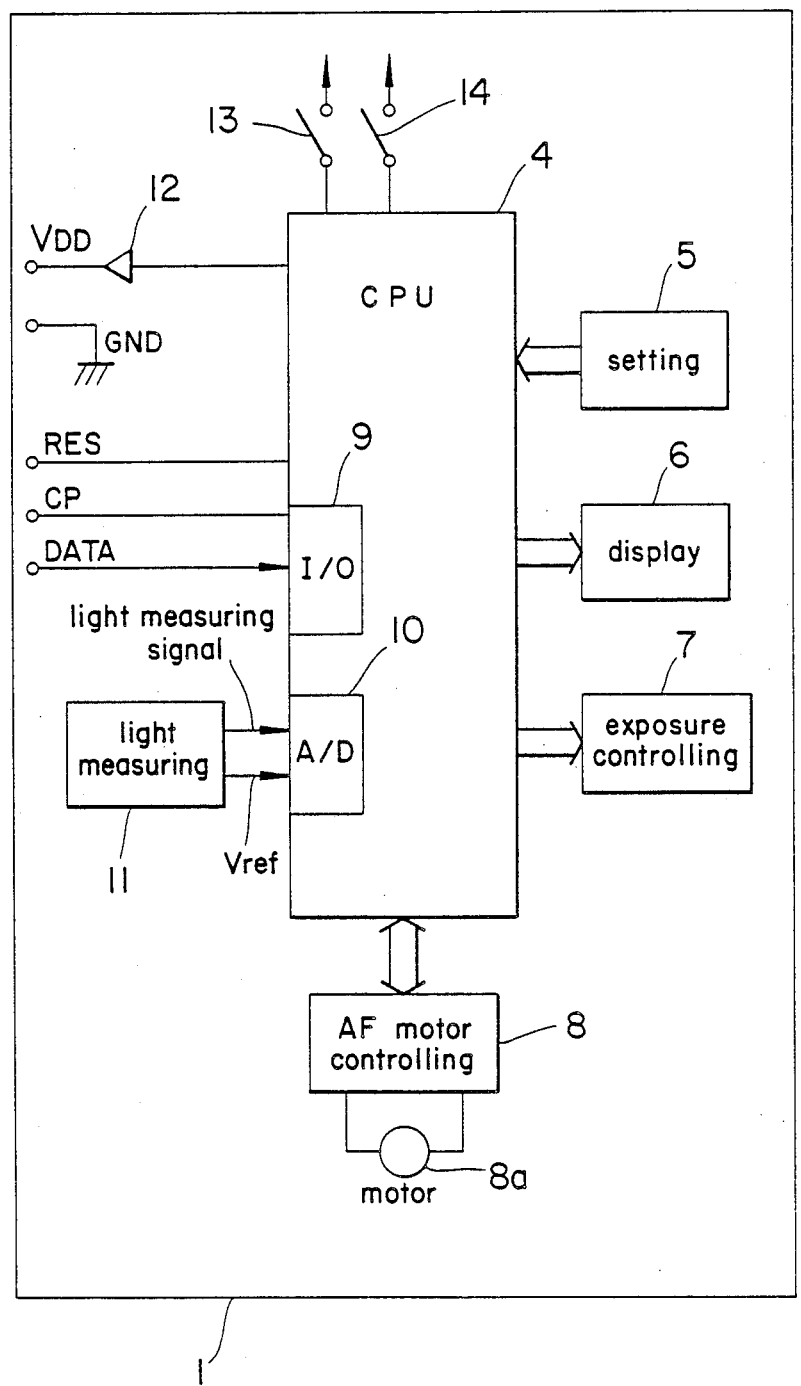

Description will now be made of an embodiment of the present invention with reference to the drawings. FIG. 3 shows an embodiment wherein a rear converter 3 with a fixed magnification power is interposed between a camera body 1 and an interchangeable objective lens 2. In the camera body 1, there is provided a microprocessor 4 which controls the operation of the entire system and which is coupled with setting means 5, a display unit 6, exposure control means 7, an AF motor control means 8, a light measuring circuit 11, etc. In the setting means 5, values of the photographing condition such as photography mode, film sensitivity, shutter speed and diaphragm value are manually set and the setting means 5 outputs data signals corresponding to those set values. The display unit 6 visibly and audibly indicates shutter speed and/or diaphragm value which are automatically controlled in accordance with the results of various arithmetic operations performed in the microprocessor 4, and indicates the photography mode selected, warning of a blur occurring shutter speed and whether or not an infocus condition has been achieved. The exposure control means 7 controls the shutter speed and/or the diaphragm aperture in response to the exposure control outputs from the microprocessor 4. The AF motor control means drives an AF motor 8a in response to the focus control output from the microprocessor 4. The light measuring circuit 11 measures the light from an object to be photographed (object light) in response to the closure of the light measuring switch 13 and generates a light measurement output for the focus adjustment and the exposure control. Reference numeral 9 denotes an I/O port which supplies clock pulse to an interchangeable objective lens 2 and to a converter lens 3 and also takes in the data signals transmitted from the objective lens 2 directly or via the converter 3. Reference numeral 10 denotes an A/D converter converting the analog signal of the light measurement output into a digital signal. GND denotes a common grounded terminal, and VDD denotes a terminal which supplies power to the interchangeable lens 2 and to the converter lens 3 via a buffer 12.

There are provided a 3-bit binary counter $15a$ and a 4-bit binary counter $16a$ in the interchangeable lens 2. The 3-bit binary counter $15a$ counts the clock pulses fed from the I/O port of the microprocessor 4 in the camera body 1, the 4-bit binary counter $16a$ counts the pulses which are output by one at every 8 pulses counted by the binary counter $15a$. The output $L_1$ of the 4-bit binary counter $16a$ is input to an address decoder $17a$, of which the output is divided into two signals, i.e., signal $L_2$ which designates the higher 3 bits of 8 bits designating the address of ROM $20a$, and a signal which designates the lower 5 bits. The former signal $L_2$ is directly sent to ROM $20a$, and the latter signal is sent to ROM $20a$ via an input selecting circuit $19a$. If a zoom lens is used as an interchangeable lens 2, the input selection circuit $19a$ receives the output of the decoder 18 which moves relative to the code plate and reads electrically or optically the code at the position corresponding to a selected zoom ratio. The decoder 18 generates a signal $L_6$ for designating the address of the lower 5 bits of ROM $20a$ in accordance with a set zoom ratio or the focal length. The input selection circuit $19a$ supplies a signal $L_4$ or $L_6$ to the ROM $20a$ in response to a selection command signal $L_3$ fed from an address decoder $17a$. A parallel/series conversion circuit $21a$ converts the 8-bit data signal sent from ROM $20a$ into serial data and outputs the serial data from the data terminal in response to the output from the 3-bit binary counter $15a$.

In the converter lens 3, there are provided a 3-bit binary counter $15b$ which has the same construction as the 3-bit binary counter $15a$ of the interchangeable lens 2, a 4-bit binary counter $16b$ which has the same construction as the 4-bit binary counter $16a$, an address decoder $17b$, ROM $20b$ and a parallel/series conversion circuit $21b$. The function and interrelationship of those components in the converter 3 are the same as those in the interchangeable lens. With reference to the signals, the signals having the same subscript corresponding to each other. In the ROM $20a$ of the interchangeable lens 2, the aforementioned fixed data to be transmitted to the camera body 1 are written at the prescribed address. In ROM $20b$ of the converter 3, data required for the arithmetic operation to be performed on the data fed from the interchangeable lens are written at the prescribed address.

FIG. 5 shows a calculation circuit 22 provided in the converter lens 3, which includes, as shown in FIGS. 6, 8, 9 and 10, a serial addition circuit $22a$ (FIG. 6), substitution circuit $22b$ (FIG. 8), an 1-bit left-shifting circuit $22c$ (FIG. 9) and a 2-bit left-shifting circuit $22d$ (FIG. 10). These circuits are, for example, by virtue of the circuits shown in FIG. 3, selected by a signal $A_8$ from the address decoder $17b$. The calculation circuit 22 receives data signals from the interchangeable lens 2 and data signals stored in the ROM $20b$ of the converter 3 and required for performing the arithmetic operation, both of which have been individually converted into serial signals, and the arithmetic circuit 22 applies predetermined selected arithmetic operations on those data signals.

In FIG. 5, the data signal DATA 0 from the interchangeable lens 2 and the data signal DATA 1 from the ROM $20b$ are applied respectively to operation circuits $22a$ to $22d$, the output terminals of which are connected to an OR gate $OR_1$ via the respective AND gates $AN_1$ to $AN_4$. Control signals $C_1$ and $C_2$ fed through the line $A_8$ are applied to the input terminals of the AND gates $AN_1$ to $AN_4$ directly or via inverters $IN_1$ and $IN_2$. Thus, as shown in TABLE 2, one of the outputs of any arithmetic circuit will be selected.

TABLE 2

| CONTROL INPUT | | OUTPUT DATA | GATE TO BE OPENED |
|---|---|---|---|
| $C_1$ | $C_2$ | | |
| 0 | 0 | $Q_1$ | $AN_1$ |
| 0 | 1 | $Q_2$ | $AN_2$ |
| 1 | 0 | $Q_3$ | $AN_3$ |
| 1 | 1 | $Q_4$ | $AN_4$ |

In the addition circuit shown in FIG. 6, first, the carry information Cy output from the $\overline{Q}$ terminal of a flip-flop $FF_1$ is reset by a reset pulse RES which is to be input ahead of the clock pulse Cp. Next, the two serial data of DATA 0 and DATA 1 fed from the interchangeable lens 2 and the ROM of the converter 3 are sequentially input, in synchronization with the clock pulse CP, to two input terminals A and B starting from the lowest-state-bit LSB. The output $S_0$ of a NOR gate $NR_1$ is an exclusive OR of A+B. By virtue of NOR gate $NR_2$, an additional exclusive OR of A+B+Cy will be obtained from A+B and a carry data Cy and the result of the logic operation will be output from NOR gate $NR_2$ as a sum S. A carry data output $S_1$ invertedly output from the OR gate $OR_2$ is delayed for a period of 1 clock pulse by a D-type flip-flop $FF_1$ for performing an additive operation in the next digit and is output as a carry data Cy. In the embodiment illustrated in FIG. 7, the signal A is "00011110", the signal B is "00001010", the carry signal is "00011100", and the sum signal S is "00101000".

In the substitution circuit shown in FIG. 8, a control input signal C is input directly or via an inverter $IN_5$ to each terminal of AND gates $AN_8$ and $AN_9$ of which the other terminals receive one of two data inputs A and B, so that the signals A will be output from the gate $OR_3$ when the control input signal C is "0" and the signal B will be output from the gate $OR_3$ when the control input signal C is "1".

The left bit shifting circuits in FIGS. 9 and 10 comprise one or three 2-input addition circuit FA shown in FIG. 6 with the circuit arranged as illustrated. In the 1-bit shifting circuit in FIG. 9, the two input terminals of the additional circuit $FA_1$ are connected with each other to have one input, and in the 2-bit shifting circuit in FIG. 10, two addition circuit $FA_2$ and $FA_3$, which have their two input terminals connected with each other, have their input terminals connected to a common input terminal. The outputs of the addition circuits are connected to two inputs of the third addition circuit $FA_4$ so that the output can be derived from the output terminal of the third addition circuit $FA_4$.

Figure 4:
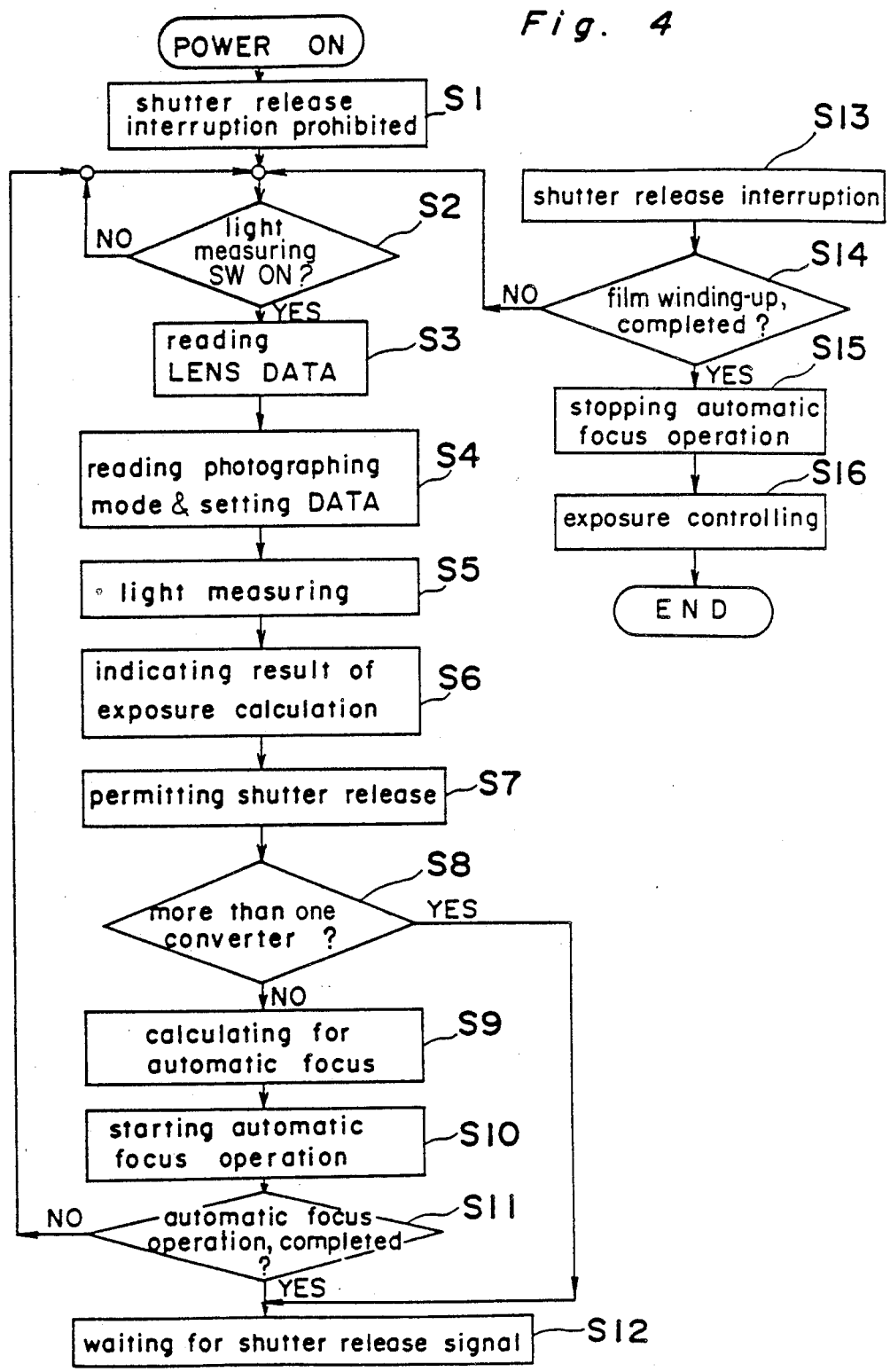
FIG. 4 is a flow chart showing the operational sequence of the camera in FIG. 3.

FIG. 4 shows the operational sequence of the microprocessor shown in FIG. 3. The operation of the microprocessor in the camera system will be described with reference to FIG. 4. When the power supply switch (not shown) of the camera body 1 is turned on, the microprocessor 4 is initialized and the shutter release interruption is prohibited in step S1. After that, if the light measuring switch 13 is turned on in step S2, the microprocessor 4 starts the sequence of reading the data from the lens in step S3. First, power supply voltage VDD starts to be supplied to the interchangeable lens 2 and the converter lens 3 via a buffer 12. Then, the resetting operation of the circuit of the interchangeable lens 2 and the converter lens 3 will be performed by switching reset pulse RES from Low to High. After the reset operation is completed, the microprocessor 4 in the camera body 1 may start transmission of clock pulses CP from the I/O port. These clock pulses are simultaneously supplied to both of the interchangeable lens 2 and the converter lens 3. The 3-bit binary counters $15a$ and $15b$ of the interchangeable lens 2 and the converter lens 3 produce one pulse at every input of eight clock pulses and supply the pulse to the next state 4-bit binary counters $16a$ and $16b$. The 4-bit binary counters $16a$ and $16b$ sequentially generate signal $L_1$ or $A_1$ as shown in TABLE 3 in response to the pulse fed from the 3-bit binary counters $15a$ and $15b$, supplying those signals $L_1$ and $A_1$ to the address decoders $17a$ and $17b$ respectively.

TABLE 3

| INPUT ORDER OF INPUT PULSE | OUTPUT $L_1/A_1$ |
| --- | --- |
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |

The address decoders $17a$ and $17b$ generate signals $L_2$, $L_4$ and $A_2$, $A_4$ for designating the addresses of ROMs $20a$ and $20b$ in accordance with the signals $L_1$ and $A_1$ from the 4-bit binary counters $16a$ and $16b$. The signals $L_2$ and $A_2$ designate the higher 3 bits of 8-bit addresses of ROMs $20a$ and $20b$, and the signals $L_4$ and $A_4$ also designate the lower 5 bits of the same 8-bit addresses. In addition, when a zoom lens is used as the interchangeable lens 2, the lower 5 bits of the address of ROM $20a$ may be designated by means of the output $L_2$ of the decoder 18 corresponding to the selected zoom ratio. The selection of the address' lower 5-bits designating data $L_4$ and $L_6$ is performed in the input selection circuit $19a$ by means of the output $L_3$ of the address decoder $17a$. The output $L_5$ of the input selection circuit $19a$ will, therefore, designate the address lower-ranking 5-bits.

TABLEs 4, 5 and 6 show the relationships between the addresses of the interchangeable lenses of fixed focal length type and zooming type and the converter lens 3, and the outputs of the address decoders $17a$ and $17b$.

TABLE 4

| FIXED FOCAL LENGTH INTERCHANGEABLE LENS | | | |
| --- | --- | --- | --- |
| $L_1$ | ADDRESS HIGHER-3-BITs $L_2$ | ADDRESS LOWER-5-BITs $L_5$ | CONTENT |
| 0000 | 000 | 00000 | IMPERFECT COUPLING CHECKING CODE |
| 0001 | 000 | 00001 | MINIMUM F-NUMBER |
| 0010 | 000 | 00010 | MAXIMUM F-NUMBER |
| 0011 | 000 | 00011 | DISCRIMINATING EXISTENCE OF CONVERTER(s) |
| 0100 | 000 | 00100 | RELEASE TIME LAG |
| 0101 | 000 | 00101 | LIGHT BLOCKAGE APERTURE |
| 0110 | 000 | 00110 | ROTATIONAL DIRECTION OF AF MOTOR |
| 0111 | 000 | 00111 | AF LENS SHIFTING AMOUNT CONVERSION COEFFICIENT |
| 1000 | 000 | 01000 | FOCAL LENGTH |

TABLE 5

| ZOOM INTERCHANGEABLE LENS | | | | |
| --- | --- | --- | --- | --- |
| $L_1$ | $L_3$ | ADDRESS HIGHER 3-BITs $L_2$ | ADDRESS LOWER-5-BITs $L_5$ | CONTENT |
| 0000 | 0 | 000 | 00000 | IMPERFECT COUPLING CHECKING CODE |
| 0001 | 0 | 001 | $\phi\phi\phi\phi$ | MINIMUM F-NUMBER |
| 0010 | 1 | 010 | $\phi\phi\phi \ \phi$ | MAXIMUM F-NUMBER |
| 0011 | 0 | 000 | 00011 | DISCRIMINATING EXISTENCE OF CONVERTER(s) |
| 0100 | 0 | 000 | 00100 | RELEASE TIME LAG |
| 0101 | 0 | 000 | 00101 | LIGHT BLOCKAGE APERTURE |
| 0110 | 0 | 000 | 00110 | ROTATIONAL DIRECTION OF AF MOTOR |
| 0111 | 1 | 011 | $\phi\phi\phi\phi$ | AF LENS SHIFTING AMOUNT CONVERSION COEFFICIENT |
| 1000 | 1 | 100 | $\phi\phi$ | FOCAL LENGTH |

"$\phi$" represents either "0" or "1".

TABLE 6

| CONVERTER LENS | | | | | | |
| --- | --- | --- | --- | --- | --- | --- |
| $A_1$ | ADDRESS HIGHER-3-BITs $A_2$ | ADDRESS LOWER-5-BITs $A_4$ | CONTENT | ARITHMETIC OPERATION | $C_1$ | $C_2$ |
| 0000 | 000 | 00000 | IMPERFECT COUPLING CHECKING CODE | ADDITION | 0 | 0 |
| 0001 | 000 | 00001 | MINIMUM F-NUMBER | ADDITION | 0 | 0 |
| 0010 | 000 | 00010 | MAXIMUM F-NUMBER | ADDITION | 0 | 0 |
| 0011 | 000 | 00011 | DISCRIMINATING EXISTENCE | ADDITION OF CONVERTER(s) | 0 | 0 |
| 0100 | 000 | 00100 | RELEASE TIME LAG | ADDITION | 0 | 0 |
| 0101 | 000 | 00101 | LIGHT BLOCKAGE APERTURE | SUBSTITUTION | 0 | 1 |
| 0110 | 000 | 00110 | ROTATIONAL DIRECTION OF AF MOTOR | ADDITION | 0 | 0 |
| 0111 | 000 | 00111 | AF LENS SHIFTING AMOUNT CONVERSION | SHIFTING or ADDI- | 1(0) 0 | 0(1) 0 |

TABLE 6-continued

| | | CONVERTER LENS | | | | |
|---|---|---|---|---|---|---|
| ADDRESS HIGHER-3-BITs $A_1$ | ADDRESS LOWER-5-BITs $A_2$ | $A_4$ | CONTENT | ARITH-METIC OPERA-TION | $C_1$ | $C_2$ |
| 1000 | 000 | 01000 | COEFFICIENT FOCAL LENGTH | ADDITION | 0 | 0 | the ROMs 20a and 20b send 8-bit data at the address designated by the signals $L_2$ and $L_5$ or by the signals $A_2$ and $A_4$ in the output order of $L_1$ and $A_1$ to the 8-bit parallel/series conversion circuits 21a and 21b. The 8-bit parallel/series conversion circuits 21a and 21b convert the 8-bit parallel data into 8-bit serial data sequentially from the lower rank. The control of the timing is made based on the outputs $L_7$ and $A_7$ from the 3-bit binary counters 15a and 15b. TABLE 7 shows its logic.

TABLE 7

| $L_7/A_7$ | OUTPUT |
|---|---|
| 0 0 0 | 0 0 0 0 0 0 0 1 |
| 0 0 1 | 0 0 0 0 0 0 1 0 |
| 0 1 0 | 0 0 0 0 0 1 0 0 |
| 0 1 1 | 0 0 0 0 1 0 0 0 |
| 1 0 0 | 0 0 0 1 0 0 0 0 |
| 1 0 1 | 0 0 1 0 0 0 0 0 |
| 1 1 0 | 0 1 0 0 0 0 0 0 |
| 1 1 1 | 1 0 0 0 0 0 0 0 |
| | HIGHEST- LOWEST-BIT BIT |

In the sequence as described above, the DATA 0 and DATA 1 are applied to the arithmetic circuit 22 from the ROM 20a of the interchangeable lens 2 and the ROM 20b of the converter lens 3 respectively. At this stage, the outputs as the result of desired arithmetic operation are selected and output in accordance with the operation designating data $C_1$ and $C_2$ generated from the address decoder 17b by means of the circuitry as shown in FIGS. 5 to 10.

Next, the operation of the embodiment mentioned above will be described with reference to the flow chart of FIG. 4. First, when the power supply switch is turned on, the shutter release will be immediately prohibited in step S1. If the light measuring switch has been turned on at step S2, the camera operation will proceed to step S3. If it has not been turned on, the camera system will wait for the operation of the light measuring switch at that state. If the light measuring switch has been closed, the microprocessor 4 in the camera body 1 receives the necessary data from the interchangeable lens 2 via the converter lens 3 through the serial I/O port 9. Then the microprocessor 4 reads binary coded data of the photographing mode, apex values Tv, Av and Sv of set shutter speed, diaphragm value and film sensitivity in step S4, and then starting light measurement by means of the light measurement circuit 11 in step S5. The A/D converter section 10 receives two input signals of the light measuring output and the reference voltage Vref and the binary quantization will be made to the light measuring output. The exposure calculation will be performed based on the quantized light measurement value, the minimum and maximum F-numbers derived from the interchangeable lens 2 and the converter lens 3 and the full aperture light measuring error compensation amount in consideration of the photographing mode derived from the setting unit 5. The result of the exposure calculation (for example, Av+Tv) are displayed on the display unit 6 and is at the same time sent to the exposure control unit 7 in step S6. At this stage, the microprocessor 4 will cancel the prohibition of the interruption of the shutter release operation so that the shutter release becomes to be operable in step S7.

Next, the microprocessor 4 discriminates the converter existence checking data in step S8. Herein, if the converter existence checking data is "00000000" or "00000001", it is judged that two or more converters 3 are not interposed, starting the range-finding or focus detecting operation for automatic focusing and determines the amount and direction of the rotation of the AF motor 8a based on the result of the focus detection and on the lens shifting amount conversion coefficient derived from the interchangeable lens 2 and the converter lens 3, and on the AF motor rotating direction data in step S9. The resultant signal of the determination is sent to the AF motor control device 8, which controls the shifting of the lens in accordance with the input data in step S10.

When the automatic focusing operation is completed at step S11, the camera operation will proceed to step S12, waiting for the interruption by the shutter release operation and then proceeds to the interruption processing routine by the shutter release operation in steps S13 to S16. Also, when the shutter release operation is made before the automatic focusing operations is completed, the camera operation proceeds to the interruption processing routine. At this time, if the film advancing has been completed at step S14, after stopping the automatic focusing operation at step S15, the camera operation proceeds to the exposure control operation of step S16.

The exposure control unit 7 controls the camera photographing operation, including the shutter speed and diaphragm control in accordance with the previously obtained result of the exposure calculation and the release time lag data which is input from the interchangeable lens 2 and the converter 3.

On the other hand, if the converter existence checking data which is read from the interchangeable lens 2 is neither "00000000" nor "00000001", it is judged that two or more converters 3 are attached in the camera, permitting the interruption by the shutter release operation without automatic focus operation, so that a cycle of the camera operation will be completed.

Figure 11B:
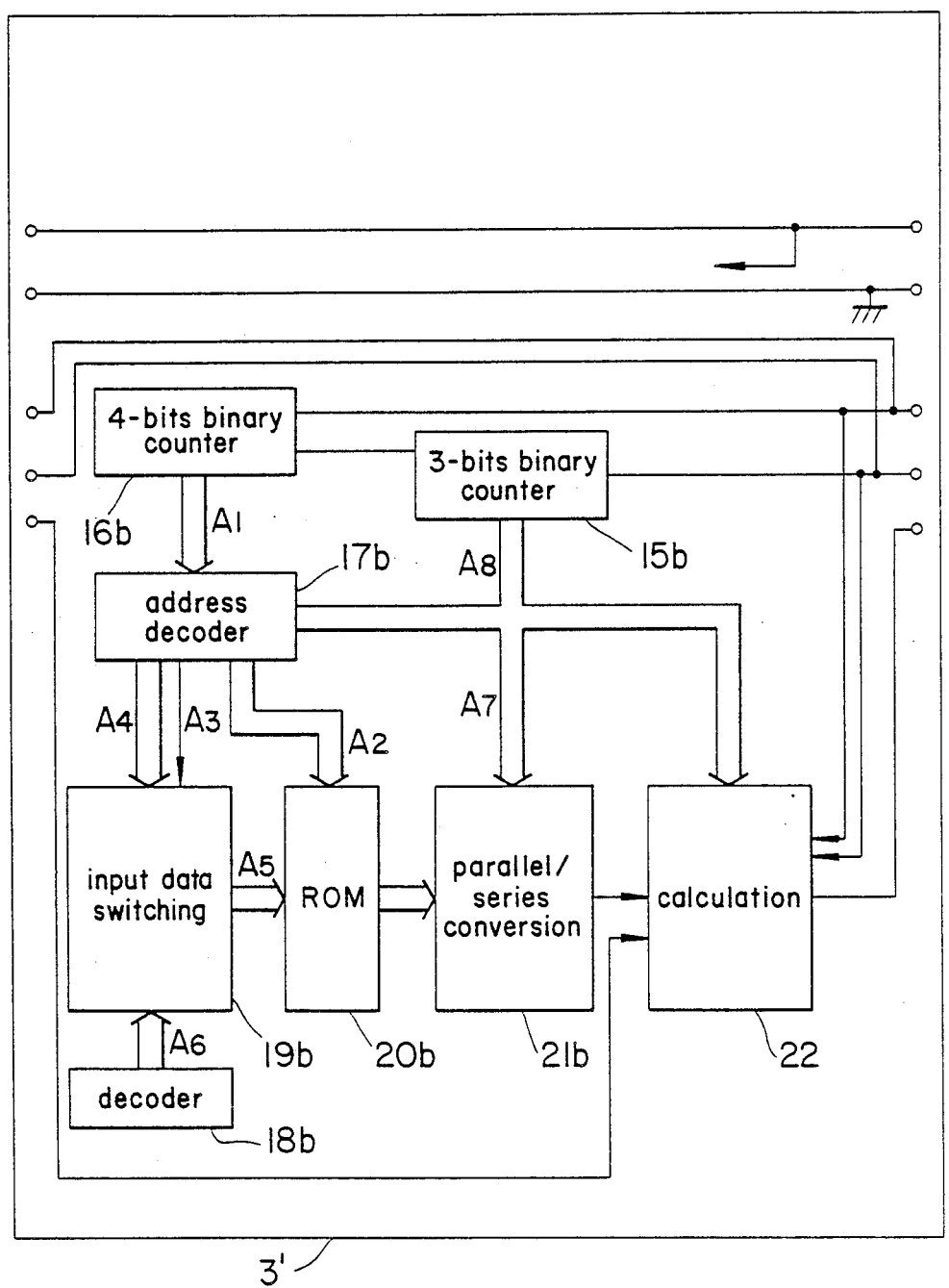
FIG. 11 shows a relationship of block diagrams 11(A), 11(B) and 11(C) of an intermediate accessory and its related section of another embodiment.
Figure 11C:
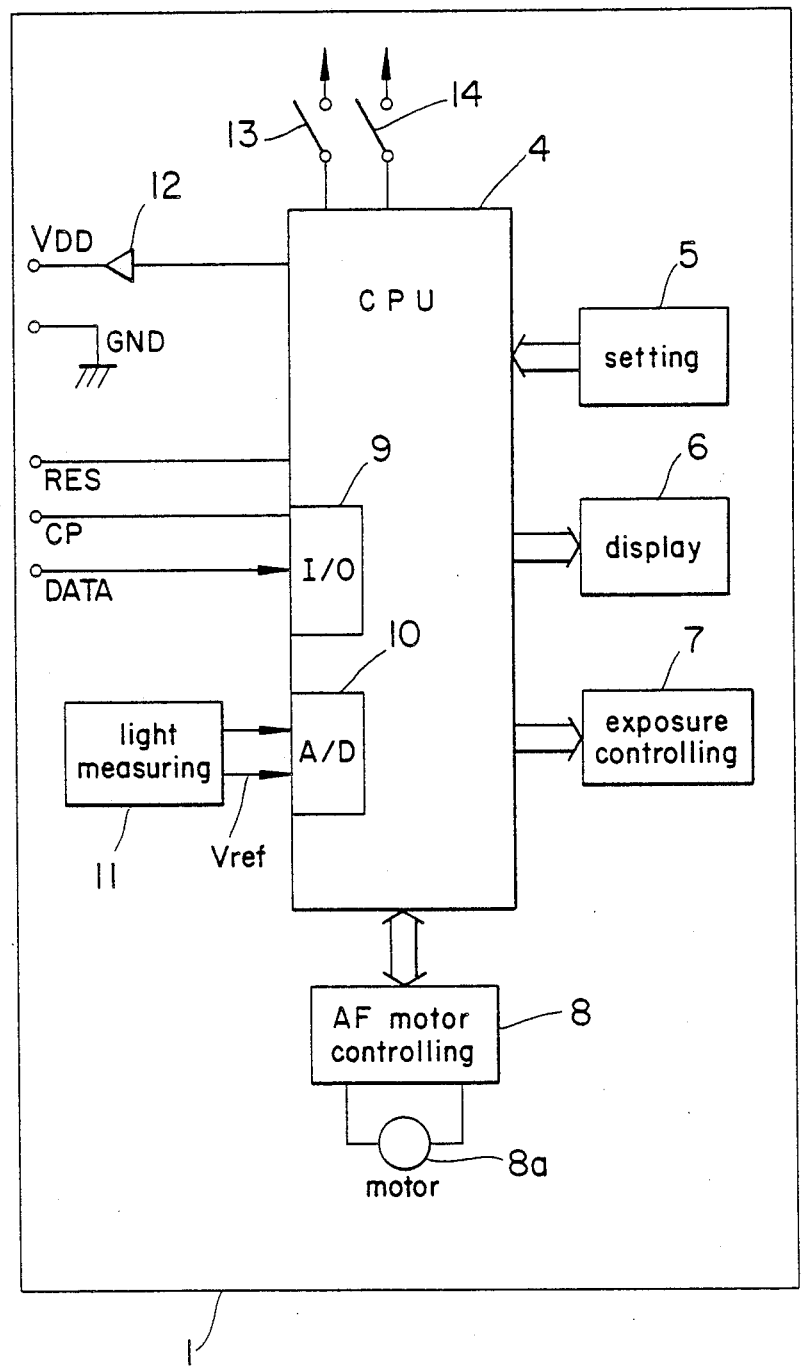

Next, description is made about in which a magnification variable zoom converter lens 3' is mounted between the interchangeable lens 2 and the camera body 1. FIG. 11 shows the block diagram of its circuit. In FIG. 11, the same numbers are given to the units and control signals performing the same functions as those in FIG. 3 and their description are omitted. The role of the zoom converter 3' will be carried out if it performs the arithmetic conversion of the data fed from the interchangeable lens 2 in accordance with the set zoom ratio (magnifying power) of the zoom converter lens and sends the resultant data to the camera body 1. In the case of using the zoom converter, however, a fixed value can not be added to the received data since the data to be added or substituted may vary in response to the zooming. Therefore, a decoder 18b should be provided in the zoom converter lens 3', which consists, for example, of a code plate and an electrical or optical code reading device which is movable relatively to the code plate utilized. Furthermore, the decoder 18b should be so provided that the address signal $A_6$ having a value corresponding to the zoom ratio, which is generated from the decoder 18b, can be compared to the table data previously set in ROM 20b. The logic table corresponding to TABLE 6 is shown in TABLE 8. Herein, the selection of the lower 5-bit address designating data $A_4$ and $A_6$ is performed by means of the output $A_3$ of the address decoder 17b in the input selection circuit 19b, so that the output $A_5$ of the input selection circuit 19b designates the lower 5-bits of the address of ROM 20b.

lens 2 is sent to the camera body 1 without being modified, in other words, "00000000" being added.

Next, the AF lens shifting amount conversion coefficient magnification "1" sent from the interchangeable lens 2 is transmitted to the camera body 1 after substituting the value "1" for a numerical value corresponding to the zooming of the zoom converter lens 3'. In the camera body 1, the driving of the AF motor 8a is controlled based on the value K which can be obtained by multiplying the two data received together, namely, the AF lens shifting amount conversion coefficient multiplied by the AF lens shifting amount conversion coefficient magnification. The operation sequence at this time is shown in FIG. 12. Note that FIG. 12 shows only "lens data reading" in FIG. 4. The rest of the operating sequences are in common with those shown in FIG. 4. Also, logic diagrams for the interchangeable lens and the zoom converter lens 3' are shown in TABLEs 9 and 10, wherein the interchangeable lens is a zoom lens.

TABLE 8

| | | ZOOM CONVERTER LENS | | | |
|---|---|---|---|---|---|
| | | ADDRESS HIGHER-3-BITs | ADDRESS LOWER-5-BITs | | ARITHMETIC |
| $A_1$ | $A_3$ | $A_2$ | $A_4$ | CONTENT | OPERATION |
| 0000 | 0 | 000 | 00000 | IMPERFECT COUPLING | ADDITION |
| 0001 | 1 | 001 | φφφφ | MINIMUM F-NUMBER | ADDITION |
| 0010 | 1 | 010 | φφφφ | MAXIMUM F-NUMBER | ADDITION |
| 0011 | 0 | 000 | 00011 | DISCRIMINATING EXISTENCE OF CONVERTER(s) | ADDITION |
| 0100 | 0 | 000 | 00100 | RELEASE TIME LAG | ADDITION |
| 0101 | 0 | 000 | 00101 | LIGHT BLOCKAGE APERTURE | SUBSTITUTION |
| 0110 | 0 | 000 | 00110 | ROTATIONAL DIRECTION OF AF MOTOR | ADDITION |
| 0111 | 1 | 011 | φφφφ | AF LENS SHIFTING AMOUNT CONVERSION COEFFICIENT | SHIFTING or ADDITION |
| 1000 | 1 | 100 | φφφφ | FOCAL LENGTH | ADDITION |

"φ" represents either "0" or "1".

Figure 2:
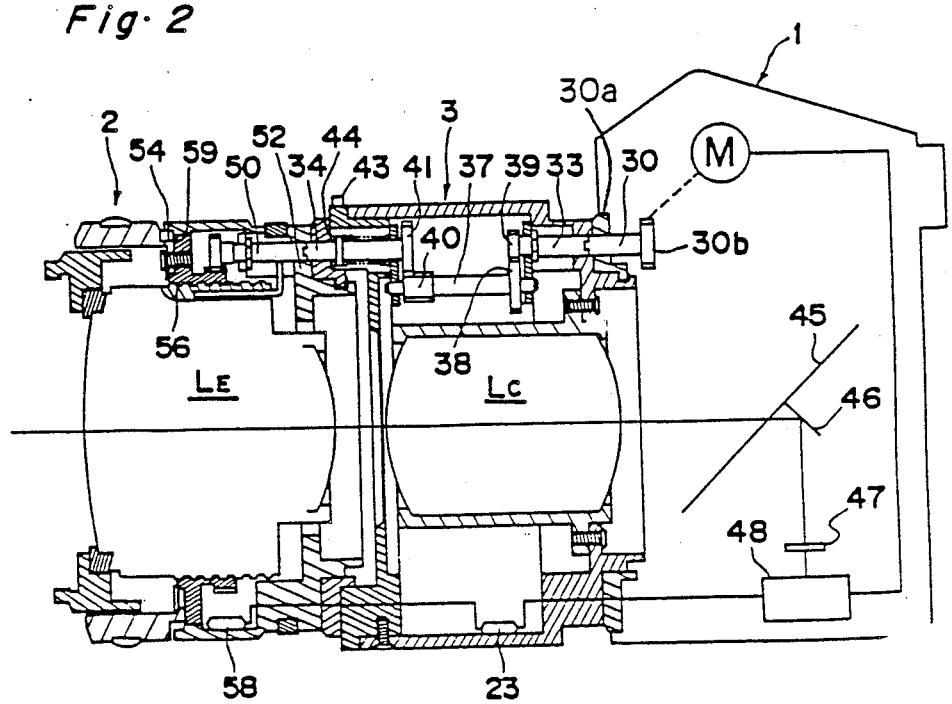
FIG. 2 is a sectional view when the converter lens shown in FIG. 1 is attached to the camera.

The operating sequence of the camera is the same as the aforementioned sequence described with reference to FIG. 2. With regard to the minimum and maximum F-numbers, the lens shifting amount conversion coefficient and the focal length, however, after performing an arithmetic operation on the data fed from the interchangeable lens for obtaining appropriate values corresponding to the zoom ratio of the zoom converter lens 3', the calculated data value is sent to the camera body 1.

Next, referring to another embodiment using a magnification variable zoom converter lens 3', the circuit configuration ma well be the same as that in FIG. 11, the AF lens shifting amount conversion coefficient magnification shall be set in ROMs 20a and 20b in addition to the previously described nine kinds of data. The AF lens shifting amount conversion coefficient magnification of the interchangeable lens is set "1", and the AF lens shifting amount conversion coefficient magnification of the zoom converter lens 3' is set as a varying ratio of the AF lens shifting amount conversion coefficient which varies in response to the zooming of the converter. When a zoom converter lens 3' is attached to the interchangeable lens 2, the AF lens shifting amount conversion coefficient fed from the interchangeable

TABLE 9

| | | ZOOM INTERCHANGEABLE LENS | | |
|---|---|---|---|---|
| | | ADDRESS HIGHER 3-BITs | ADDRESS LOWER 5-BITs | |
| $L_1$ | $L_3$ | $L_2$ | $L_5$ | CONTENT |
| 0000 | 0 | 000 | 00000 | IMPERFECT COUPLING CHECKING CODE |
| 0001 | 0 | 001 | φφφφ | MINIMUM F-NUMBER |
| 0010 | 1 | 010 | φφφφ | MAXIMUM F-NUMBER |
| 0011 | 0 | 000 | 00011 | DISCRIMINATING EXISTENCE OF CONVERTER(s) |
| 0100 | 0 | 000 | 00100 | RELEASE TIME LAG |
| 0101 | 0 | 000 | 00101 | LIGHT BLOCKAGE APERTURE |
| 0110 | 0 | 000 | 00110 | ROTATIONAL DIRECTION OF AF MOTOR |
| 0111 | 1 | 011 | φφφφ | AF LENS SHIFTING AMOUT CONVERSION COEFFICIENT |
| 1000 | 0 | 000 | 00111 | AF LENS SHIFTING AMOUNT CONVERSION COEFFICIENT MAGNIFICATION POWER (1) |
| 1001 | 1 | 100 | φφφφ | FOCAL LENGTH |

TABLE 10

| | | | ZOOM CONVERTER LENS | | |
|---|---|---|---|---|---|
| $A_1$ | $A_3$ | ADDRESS HIGHER 3-BITs $A_2$ | ADDRESS LOWER 5-BITs $A_5$ | CONTENT | ARITHMETIC OPERATION |
| 0000 | 0 | 000 | 00000 | IMPERFECT COUPLING CHECKING CODE | ADDITION |
| 0001 | 1 | 001 | φφφφ | MINIMUM F-NUMBER | ADDITION |
| 0010 | 1 | 010 | φφφφ | MAXIMUM F-NUMBER | ADDITION |
| 0011 | 0 | 000 | 00011 | DISCRIMINATING EXISTENCE OF CONVERTER(s) | ADDITION |
| 0100 | 0 | 000 | 00100 | RELEASE TIME LAG | ADDITION |
| 0101 | 0 | 000 | 00101 | LIGHT BLOCKAGE APERTURE | SUBSTITUTION |
| 0110 | 0 | 000 | 00110 | ROTATIONAL DIRECTION OF AF MOTOR | ADDITION |
| 0111 | 1 | 000 | 00111 | AF LENS SHIFTING AMOUNT CONVERSION COEFFICIENT | ADDITION |
| 1000 | 1 | 011 | φφφφ | AF LENS SHIFTING AMOUNT CONVERSION COEFFICIENT MAGNIFICATION POWER | SUBSTITUTION |
| 1001 | 1 | 000 | φφφφ | FOCAL LENGTH | ADDITION |

As described above, n the case that there is interposed one intermediate accessory according to the present invention between the camera body and the interchangeable lens, the camera system can be operated best. In the case of interposing more than one intermediate accessories, the disadvantage due to interposing more than one intermediate accessories can be automatically prevented.

In the present invention, although the data discriminating the existence of the converter(s) is independent of the other data, the discriminating data can be written together with the imperfect coupling checking code or release time lag data for example as one data so as to be stored in the same address. In the case the data discriminating the existence of the converter(s) is written together with the imperfect coupling checking code data as one data, a data "10101010" is memorized in ROM of the interchangeable lens and a data "00000001" is memorized in ROM of the converter lens for example. If there is no converter lens mounted on the camera system, a data value "10101010" is sent to the camera body as an imperfect coupling checking code data. If there is only one converter lens interposed, a data value "10101011" is sent to the camera body as an imperfect coupling checking code. If there are two converter lenses, a data value "10101100" is sent to the camera body as an imperfect coupling checking code data. In the camera body, it is judged whether or not a converter lens is correctly attached to the camera in accordance with discriminating whether or not the higher 7 bits of the data sent to the camera body are equal to "1010101". If the higher 7 bits of the data sent to the camera body are equal to "1010101", the normal operation is performed by the camera body. If the higher 7 bits of the data sent to the camera body are not equal to "1010101", the operation of the automatic focusing device can be prohibited.

If the data discriminating the existence of the converter(s) is written together with the release time lag data value as one data, the effect similar to that of the present embodiment can be obtained by a memorizing way of the time lag data different from that of the present embodiment. That is, all of the release time lag data in the interchangeable lens are initialized to be "00000000" and the release time lag data in the converter lens to be "00000001". By this way, when no converter lens, one converter lens or two converter lenses are interposed, a data value "00000000", "00000001" or "00000010" is respectively sent to the camera body as an imperfect coupling checking code data value. When the camera body receives a data "00000000", a normal exposure and automatic focusing operations are performed. When the camera body receives a data "00000001", the automatic focusing operation is normally performed but the exposure operation is performed in the manner that the period from the mirror up operation to the shutter curtain starting is made a little longer than the normal period. When the camera body receives a data value of "00000010" or larger than "0000010", the automatic focusing operation is prohibited. The exposure control operation is performed similarly to the case of a data value "00000001".

Moreover, in the present invention, though the explanation is made about the case of a converter lens, the same concept also can be applied to the cases of the other accessories such as an intermediate ring and bellows.

As described above, in the camera system comprising the intermediate accessory according to the present invention, since the number of the attached intermediate accessories is checked, when the intermediate accessories of more than the permitted number are interposed, the automatic focusing operation is prohibited. Therefore, a large driving torque does not occur so as to prevent the bad effect on the driving system.

What is claimed is:

1. A camera system which includes
    a camera body having a first type of connecting means,
    an interchangeable lens having a second type of connecting means which is connectable to the first type of connecting means, and
    one or more intermediate accessories having a connecting means of the first type and a connecting means of the second type,
    whereby said first type of connecting means of the intermediate accessories are connectable with one of the second type of connecting means of the interchangeable lens and the second type of connecting means of another intermediate accessory and
    said second type of connecting means of the intermediate accessories are connectable with one of the first type of connecting means of the camera body and the first type of connecting means of another intermediate accessory, said camera system further comprising:

first data producing means, provided in the interchangeable lens, for producing a first data indicative of the interchangeable lens;

first data sending means, provided in the interchangeable lens, for sending the first data to a device which is connected to the interchangeable lens by means of the second type of connecting means thereof;

second data producing means, provided in said one or more intermediate accessories, for producing a second data indicative of the presence of an intermediate accessory;

adding means, provided in said one or more intermediate accessories, for adding the second data to a data supplied from a device which is connected to the intermediate accessory by means of the first type of connecting means thereof and for producing a third data based on the result of the addition;

second data sending means, provided in said one or more intermediate accessories, for sending the third data to a device which is connected to an intermediate accessory by means of the second type of connecting means thereof;

discriminating means, provided in the camera body, for discriminating whether or not the data sent from a device connected to the camera body by means of the first type connecting means thereof represents a predetermined value which indicates that the number of intermediate accessories inserted between the camera body and the interchangeable lens is less than two;

focus control means, provided in the camera body, for automatically controlling the focusing condition of the interchangeable lens interconnected to the camera body directly or through an intermediate accessory; and interrupting means for interrupting the operation of the focus control means when the discriminating means discriminates that the data sent from the device connected to the camera body does not represent the predetermined value.

2. The camera system as claimed in claim 1, further comprising means, provided in the intermediate accessory, for producing a plurality of types of data showing a plurality of types of information, and wherein said first data is produced together with the plurality of types of data.

3. The camera system as claimed in claim 2, wherein the plurality of types of data producing means, produces a plurality of data signals including a plurality of bits, and said first data is included at predetermined bits of the plurality of data signals.

4. An intermediate accessory including a rear portion for interconnecting the intermediate accessory to a front portion of a camera body having an automatic focusing operation and a front portion for interconnecting the intermediate accessory to a rear portion of an interchangeable lens or an other intermediate accessory, comprising:

data producing means for producing a first data indicative of the intermediate accessory;

adding means for adding the first data produced by the first data producing means to a data which is produced by, and sent out from, the rear portion of the interchangeable lens and consequently sent to the front portion of the intermediate accessory, and for producing another data based on a result of the addition, the another data controlling an interruption of automatic focusing operation of the camera body when two or more of the intermediate accessories are interconnected between the camera body and the interchangeable lens; and data sending means for sending the another data from the rear portion of the intermediate accessory.

5. The intermediate accessory as claimed in claim 4, further comprising means for producing a plurality of kinds of data showing a plurality of kinds of information, and wherein the first data is produced together with the plurality of kinds of data.

6. The intermediate accessory as claimed in claim 5, wherein the plurality of kinds of data producing means produces a plurality of data signals including a plurality of bits, and the first data is included at predetermined bits of the plurality of data signals.

7. A camera system which includes
a camera body having a first type of connecting means,
an interchangeable lens having a second type of connecting means which is connectable to the first type of connecting means, and
one or more intermediate accessories having a connecting means of the first type and a connecting means of the second type,
whereby said first type of connecting means of the intermediate accessories are connectable with one of the second type of connecting means of the interchangeable lens and the second type of connecting means of another intermediate accessory and
said second type of connecting means of the intermediate accessories are connectable with one of the first type of connecting means of the camera body and the first type of connecting means of another intermediate accessory, said camera system further comprising:

first data producing means, provided in the interchangeable lens, for producing a first data indicative of the interchangeable lens;

first data sending means, provided in the interchangeable lens, for sending the first data to a device which is connected to the interchangeable lens by means of the second type of connecting means thereof;

second data producing means, provided in the intermediate accessories, for producing a second data indicative of the presence of an intermediate accessory;

adding means, provided in the intermediate accessories, for adding the second data to a data supplied from a device which is connected to an intermediate accessory by means of the first type of connecting means thereof and for producing a third data based on the result of the addition;

second data sending means, provided in the intermediate accessories, for sending the third data to a device which is connected to an intermediate accessory by means of the second type of connecting means thereof;

discriminating means, provided in the camera body, for discriminating whether or not the data sent from a device connected to the camera body by means of the first type of connecting means thereof represents a predetermined value which indicates that the number of intermediate accessories inserted between the camera body and the interchangeable lens is less than two;

interrupting means for interrupting an operation of the camera when the discriminating means discriminates that the data sent from the device connected to the camera body does not represent the predetermined value.

* * * * *